United States Patent
Henmi et al.

(10) Patent No.: US 7,414,346 B1
(45) Date of Patent: Aug. 19, 2008

(54) BRUSH HOLDER FOR DYNAMO-ELECTRIC MACHINE

(75) Inventors: Shinsuke Henmi, Tokyo (JP); Kyouhei Yamamoto, Tokyo (JP); Toshinori Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/695,840

(22) Filed: Oct. 26, 2000

(30) Foreign Application Priority Data

Aug. 29, 2000 (JP) .............................. 2000-258695

(51) Int. Cl.
*H01R 39/38* (2006.01)
*H02K 13/00* (2006.01)

(52) U.S. Cl. ...................... 310/245; 310/239; 310/242

(58) Field of Classification Search ......... 310/239–251, 310/3; H02K 13/00; A02K 13/00
See application file for complete search history.

(56) References Cited

U.S. PATENT DOCUMENTS

| | | | | |
|---|---|---|---|---|
| 3,842,302 A | * | 10/1974 | Apostoleris | 310/239 |
| 4,118,647 A | * | 10/1978 | Brenner et al. | 310/239 |
| 4,311,936 A | * | 1/1982 | Ozaki et al. | 310/242 |
| 4,926,075 A | | 5/1990 | Fushiya et al. | |
| 5,066,878 A | | 11/1991 | Sekine et al. | |
| 5,159,222 A | * | 10/1992 | Southall | 310/239 |
| 5,610,467 A | | 3/1997 | Shiah et al. | |
| 5,785,145 A | * | 7/1998 | Wakao et al. | 180/443 |
| 5,810,111 A | * | 9/1998 | Takeuchi et al. | 180/443 |
| 6,011,341 A | | 1/2000 | Toya et al. | |
| 6,246,144 B1 | * | 6/2001 | Hockaday et al. | 310/242 |
| 6,429,553 B1 | * | 8/2002 | Taniguchi et al. | 310/67 R |

FOREIGN PATENT DOCUMENTS

| | | |
|---|---|---|
| EP | 0 790 693 A2 | 8/1997 |
| EP | 0 806 818 A2 | 11/1997 |
| EP | 0 935 318 A2 | 8/1999 |
| EP | 1 022 210 A1 | 7/2000 |
| GB | 2 032 195 A | 4/1980 |
| JP | 55-083866 | 12/1978 |
| JP | 55-49954 | 4/1980 |
| JP | 61-74247 | 5/1986 |
| JP | 6-062775 | 9/1994 |
| JP | 8-9598 | 1/1996 |
| JP | 8-258730 | 10/1996 |
| JP | 9168256 A * | 6/1997 |
| JP | 2000-78798 | 3/2000 |
| JP | A-2000-253629 | 9/2000 |
| JP | A-2000-49180 | 8/2001 |

* cited by examiner

*Primary Examiner*—Burton Mullins
(74) *Attorney, Agent, or Firm*—Sughrue Mion, PLLC (57) ABSTRACT

Terminal plates are located in a brush holder base, a spring and a brush are located in the brush holder base, and the terminal plates are connected to pigtails in an area within 90° in a backside of an introducing portion of the pigtails in the brush, whereby operating noise and ripples of torque of a dynamo-electric machine are reduced.

2 Claims, 11 Drawing Sheets

BRUSH HOLDER FOR DYNAMO-ELECTRIC MACHINE

BACKGROUND OF THE INVENTION

1. Field of the Invention

The present invention relates to a structure of a brush holder used in a dynamo-electric machine.

2. Discussion of Background

Figure 12A:
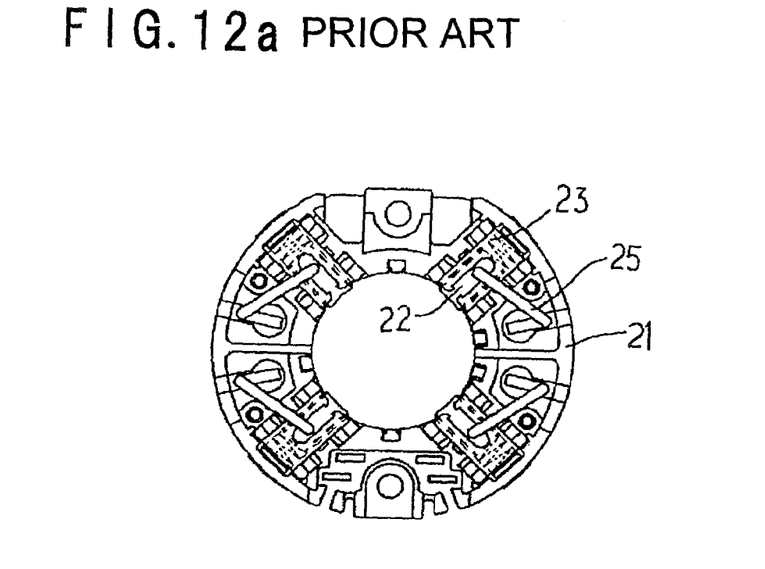
FIG. 12a is a plan view illustrating a conventional brush holder of a dynamo-electric machine.
Figure 12B:
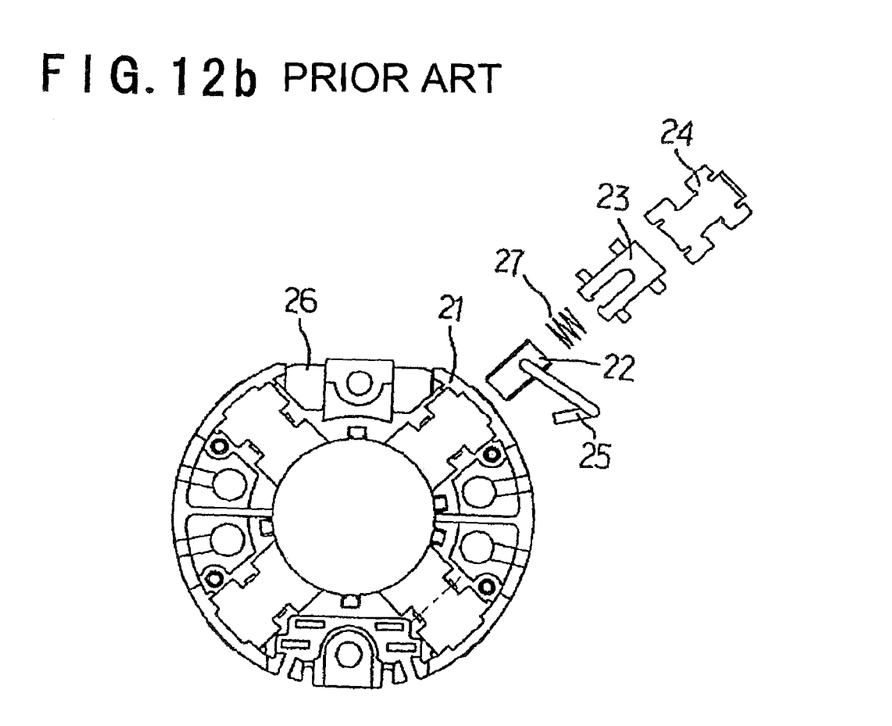
FIG. 12b is a plan view illustrating the conventional brush holder of the dynamo-electric machine.

FIGS. 12a and 12b illustrate a conventional brush holder for a dynamo-electric machine. FIG. 12a is a plan view of the brush holder, wherein components of the brush holder are assembled. FIG. 12b is a plan view, whereby a part of the components is disassembled.

In FIGS. 12a and 12b, numerical reference 21 designates a brush holder base; numerical reference 22 designates a brush; numerical reference 23 designates a metallic brush holder; numerical reference 24 designates a plate; numerical reference 25 designates a pigtail; numerical reference 26 designates a terminal plate; and numerical reference 27 designates a spring.

Figure 13:
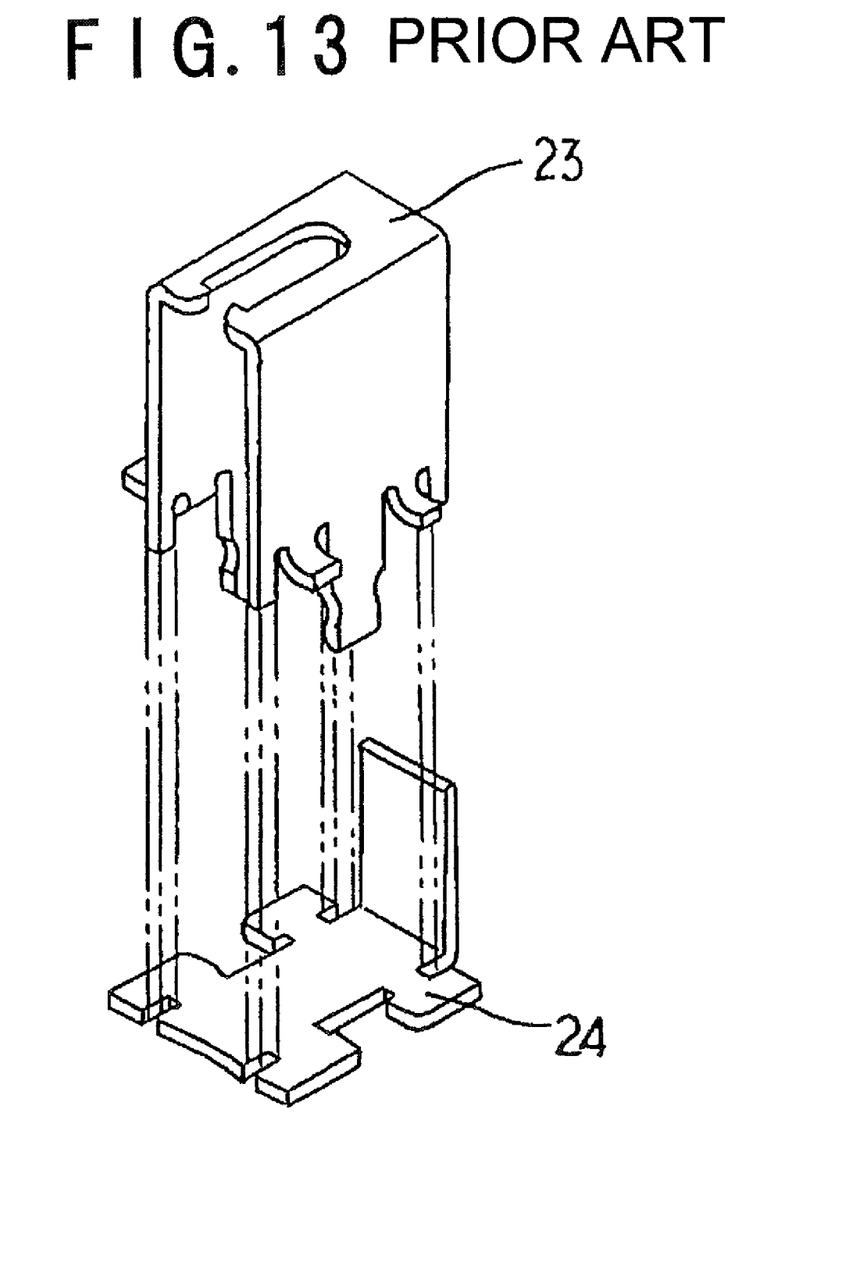
FIG. 13 is a perspective view illustrating a state that a conventional metallic brush holder is assembled with a conventional plate.
Figure 14:
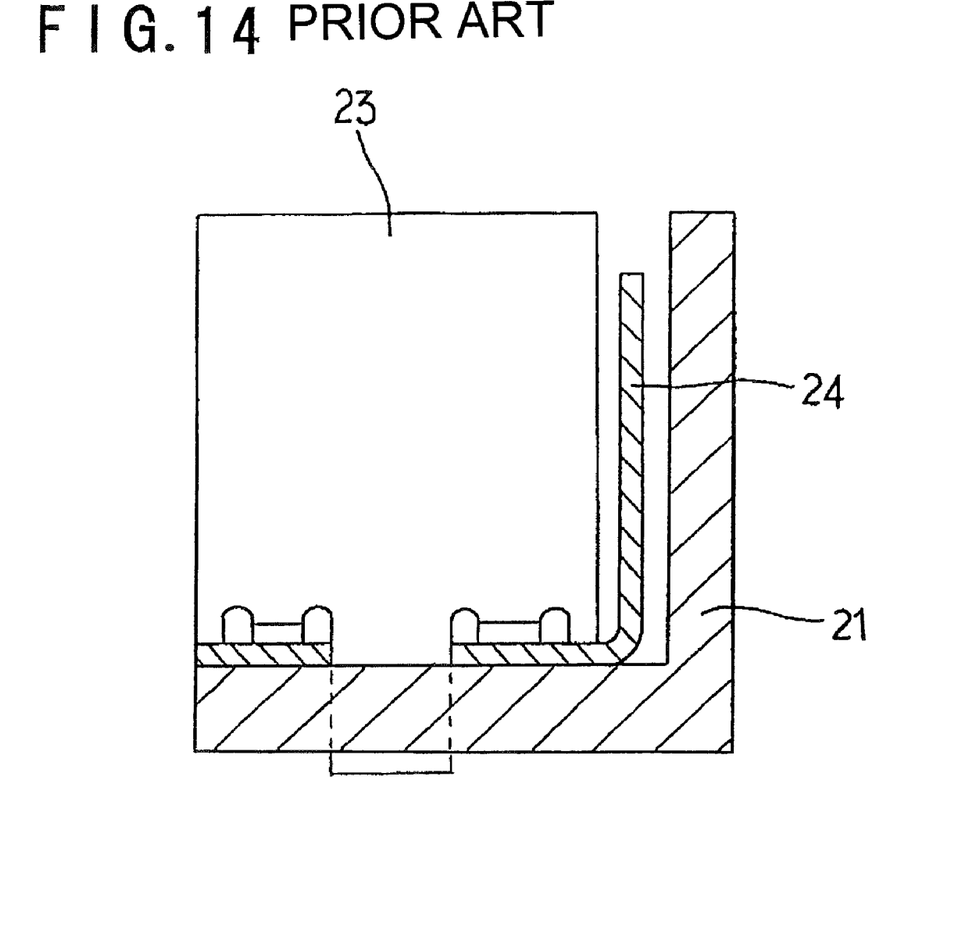
FIG. 14 is a side cross-sectional view illustrating the state that the conventional metallic brush holder is assembled with the conventional plate.

FIG. 13 is a perspective view of the metallic brush holder 23 and the plate 24 illustrating a state of assembling these. FIG. 14 is a side cross-sectional view of the metallic brush holder 23 and the plate 24.

The terminal plate 26 is formed by insert-molding, wherein after locating the plate 24 in the brush holder base 21, the metallic brush holder 23 is fixed by caulking. After assembling the metallic brush holder 23, the spring 27 is assembled inside the metallic brush holder 23, and thereafter the brush 22 is assembled. A position where the terminal plate 26 and the pigtail 25 are welded is a side of the metallic brush holder 23.

Because the conventional brush holder is constructed as described above, the terminal plate 26 is connected to the pigtail on a right side or a left side of the brush 22. Therefore, sliding of the brush was affected depending on a state of the pigtail, whereby there were problems that an operating noise of a motor and ripples of torque were increased, and that, in a dynamo-electric machine rotatable in both directions, differences of torques, of the numbers of revolutions, of operating noises, and of ripples of torques were different with respect to the rotating directions.

SUMMARY OF THE INVENTION

It is an object of the present invention to solve the above-mentioned problems inherent in the conventional technique and to provide a brush holder, which can reduce ripples of torque and operating noises in a dynamo-electric machine.

Another object of the present invention is to provide a brush holder, which can reduce differences of numbers of revolutions and torques with respect to both directions in a dynamo-electric machine rotatable in the both directions, also can reduce differences of ripples of torque with respect to the directions, and also can reduce differences of operating noises with respect to the directions, wherein when the brush holder is applied to the motor for an electric power steering, effects demonstrated by the brush holder device are remarkable.

According to a first aspect of the present invention, there is provided a brush holder, wherein a spring and a brush are set in a brush holder base, and a terminal plate and a pigtail are connected in an area within 90° from an introducing portion of the pigtail in the brush toward an outside of the brush holder.

According to a second aspect of the present invention, there is provided the brush holder device for the dynamo-electric machine, wherein the terminal and the pigtail are connected in an area around a sliding axis of the brush within the width of the brush.

According to a third aspect of the present invention, there is provided the brush holder for the dynamo-electric machine, wherein the pigtail is introduced from the brush in a direction toward a motor shaft.

According to a fourth aspect of the present invention, there is provided the brush holder for the dynamo-electric machine, wherein a column is located in the terminal plate to connect with the pigtail.

According to a fifth aspect of the present invention, there is provided the brush holder for the dynamo-electric machine, wherein the pigtail is introduced from a backside of the brush.

According to a sixth aspect of the present invention, there is provided the brush holder for the dynamo-electric machine, wherein the dynamo-electric machine is rotatable in both directions.

According to a seventh aspect of the present invention, there is provided the brush holder for the dynamo-electric machine, wherein the dynamo-electric machine is a motor for an electric power steering.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

A detailed explanation will be given of preferred embodiments of the present invention in reference to FIGS. 1 through 11 as follows, wherein the same numerical references are used for the same or similar portions and descriptions of these portions is omitted.

Embodiment 1

Figure 1:
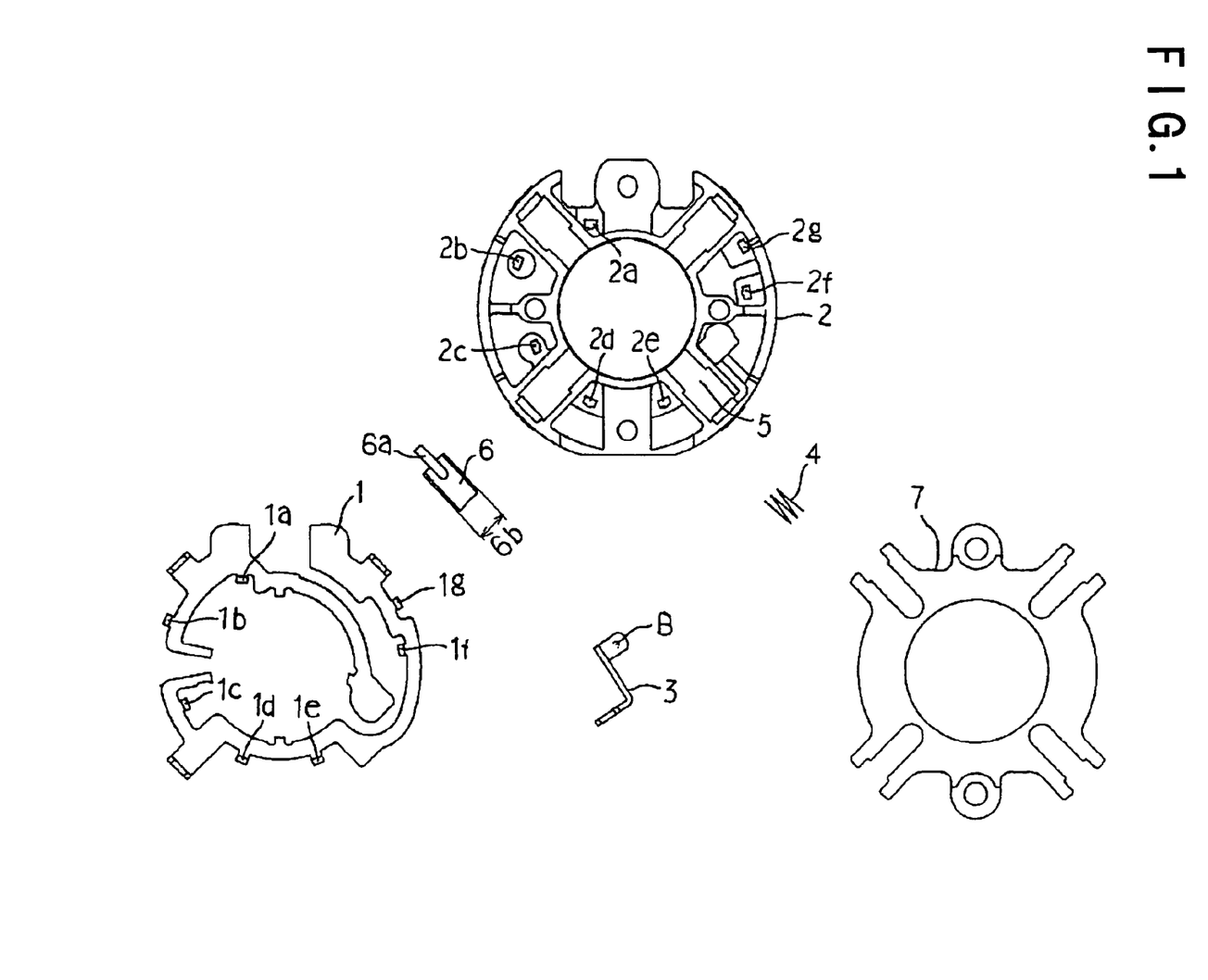
FIG. 1 is a plan view illustrating a brush holder for a dynamo-electric machine according to Embodiment 1 of the present invention in a disassembled state.
Figure 2:
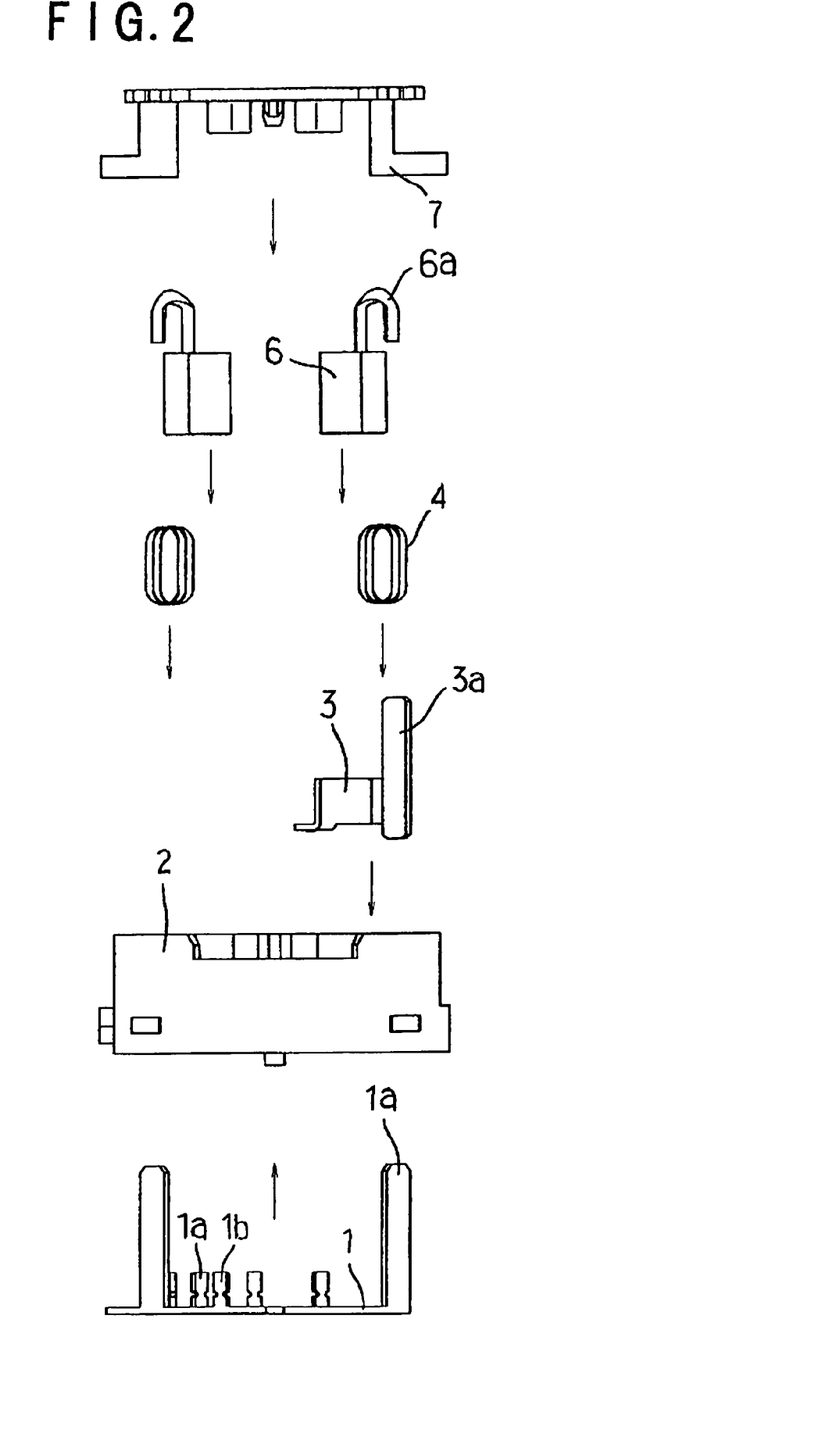
FIG. 2 is a side view of the brush holder of the dynamo-electric machine according to Embodiment 1 in a disassembled state.
Figure 3:
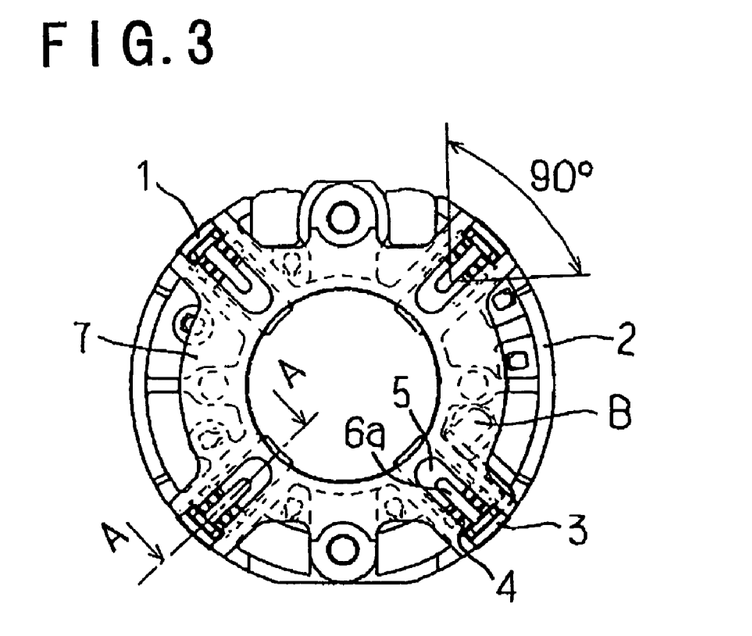
FIG. 3 is a plan view of the brush holder of the dynamo-electric machine according to Embodiment 1 in a completely assembled state.
Figure 4:
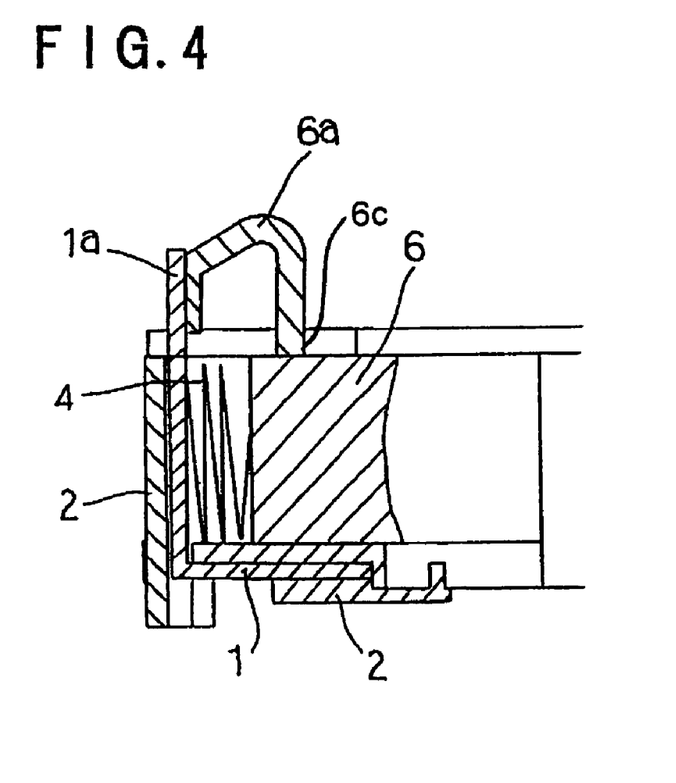
FIG. 4 is a cross-sectional view of the brush holder in FIG. 3 taken along a line A-A.

FIG. 1 is a plan view of the brush holder of the dynamo-electric machine according to Embodiment 1 of the present invention in the disassembled state provided to show various components of the brush holder. FIG. 2 is the side view of the brush holder in the disassembled state. FIG. 3 is a plan view illustrating the brush holder which is completed by assembling various components. FIG. 4 is the cross-sectional view taken along the line A-A of the brush holder illustrated in FIG. 3.

In the figures, numerical reference 1 designates a first terminal plate; numerical reference 2 designates a brush holder base; numerical reference 3 designates a second terminal plate; numerical reference 4 designates a spring; numerical reference 5 designates a step for temporal tacking, located in the brush holder base 2; numerical reference 6 designates a brush; and numerical reference 7 designates a brush holder cover.

As illustrated in the figures, a terminal plate 1, i.e. the first terminal plate, is set in a lower portion of the brush holder base 2, made of a thermo-set resin such as phenol as shown in FIG. 2, and fixed by respectively caulking at seven positions, namely protrusions 1a through 1g of the terminal plate 1 and holes 2a through 2g of the brush holder base 2.

In the next, a terminal plate 3, i.e. the second terminal plate, which is different from the terminal plate 1, is inserted from an upper side of the brush holder base 2. In the next, the spring 4 is set in the step for temporary tacking 5 from the upper side. In the next, the pigtail 6a of the brush 6 is welded to columns 1a and 3a of the terminal plate 1 and the terminal plate 3. Thus welded pigtail 6a extends from an upper side of the brush holder (at introducing portion 6c) in a direction parallel to the motor shaft as illustrated in FIG. 4. Thereafter, the terminal plate 1 is connected to the terminal plate 3 by welding at a portion B, and finally the brush holder cover 7, made of the thermo-set resin such as phenol, is set.

As illustrated in FIG. 3, the terminal plate 3 is connected to the second end of the pigtail 6a in an area within 90° from the position at which the introducing portion 6c of the brush is connected to the first end of the pigtail 6a, wherein the pigtail 6a extends in a direction of a motor shaft, i.e., parallel to the motor shaft. Accordingly, it is possible to reduce a bad influence against a sliding motion of the brush 6 caused by flexibility of the pigtail 6a and vibration of the brush 6 in radial directions, whereby operating noises and ripples of torque in the dynamo-electric machine can be reduced. Further, because all pigtails extend in radial directions, in a dynamo-electric machine rotatable in both directions, differences of numbers of revolutions, of torques, of ripples of the torques, and of operating noises between the directions can be reduced.

Further, although an example that four brushes are used as illustrated above, the present invention is not limited to the brush holder having four brushes.

Further, the pigtail 6a is connected to the columns 1a, 3a of the terminal plates in an area around a sliding axis of the brush 6 so as to be disposed within the width 6b of the brush 6 and in a backside of the introducing portion 6c of the brush 6. Here, the backside of the introducing portion 6c is that area of the device which is more outside than the introducing portion.

According to the present invention, it is possible to reduce ripples of torque and operating noises by connecting the pigtail 6a to the columns 1a, 3a in the area within 90° of the introducing portion 6c from a backside of the introducing portion of the pigtail from the brush 6. That is, as shown in FIG. 3, a connecting point at which the pigtail 6a is connected to the columns 1a, 3a is present more outside than the introducing portion 6c. An imaginary line connecting the connecting point and the introducing portion 6c is at an angle within ±45° from the sliding axis of the brush 6.

Further, by extending the pigtail 6a from the brush 6 in the direction of the motor shaft and connecting a tip of the pigtail 6a to the terminals 1, 3 in the area within 90° of the backside of the introducing portion 6c of the brush 6 connected to pigtail 6a, it is possible to reduce ripples of torque and operating noises in the dynamo-electric machine.

Further, in the dynamo-electric machine rotatable in both directions, by connecting the pigtail 6a to the terminals 1, 3 in the area within 90° on the backside at which the introducing portion 6c is connected to the pigtail 6a, it is possible to reduce ripples of torque and operating noises. Further, it is possible to reduce differences of numbers of revolutions, of torques, of ripples of torques, and of operating noises with respect to the directions because the pigtails 6a of all brushes 6 have the same or substantially the same shapes.

Further, the brush holder according to the present invention is extremely effective as a brush holder for a dynamo-electric machine for an electric power steering, rotatable in both directions.

Embodiment 2

Figure 5:
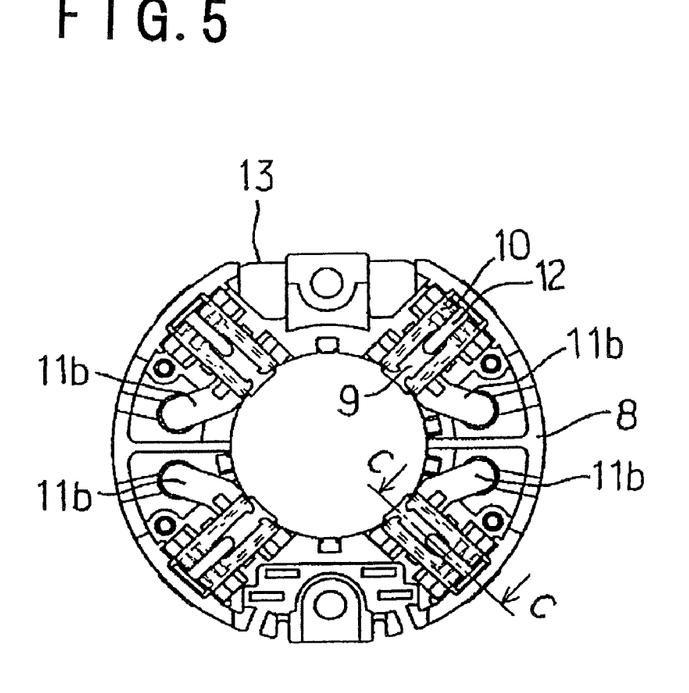
FIG. 5 is a plan view illustrating a brush holder according to Embodiment 2.
Figure 6:
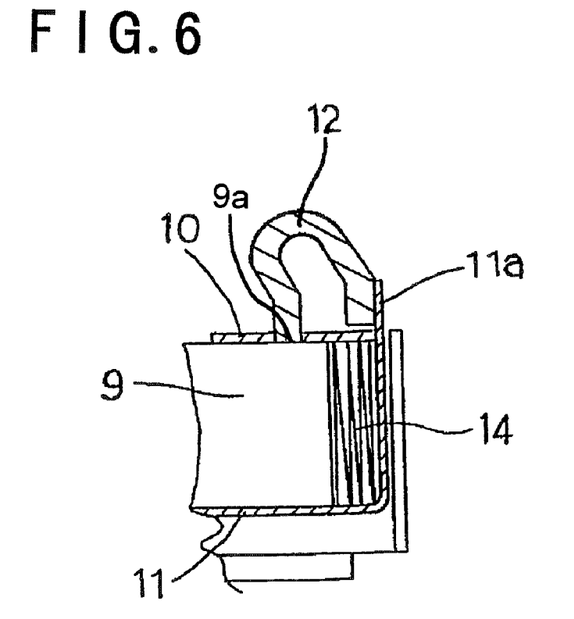
FIG. 6 is a cross-sectional view of the brush holder illustrated in FIG. 5 taken along a line C-C.

FIG. 5 is a plan view illustrating the brush holder according to Embodiment 2 of the present invention. FIG. 6 is the cross-sectional view taken along the line C-C of the brush holder illustrated in FIG. 5. Embodiment 2 is an improvement of a part of the conventional brush holder illustrated in FIGS. 12 through 14.

In the Figures, numerical reference 8 designates a brush holder base; numerical reference 9 designates a brush; numerical reference 10 designates a metallic brush holder; numerical reference 11 designates a plate; numerical reference 12 designates a pigtail; numerical reference 13 designates a terminal plate; and numerical reference 14 designates a spring.

Figure 7:
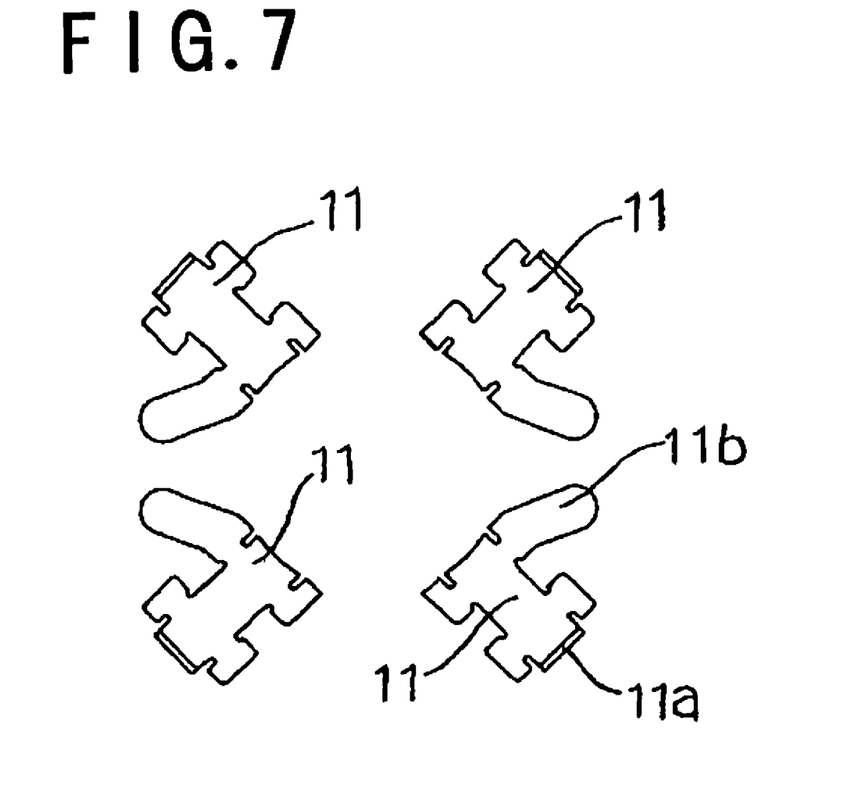
FIG. 7 is a plan view illustrating plates.
Figure 8:
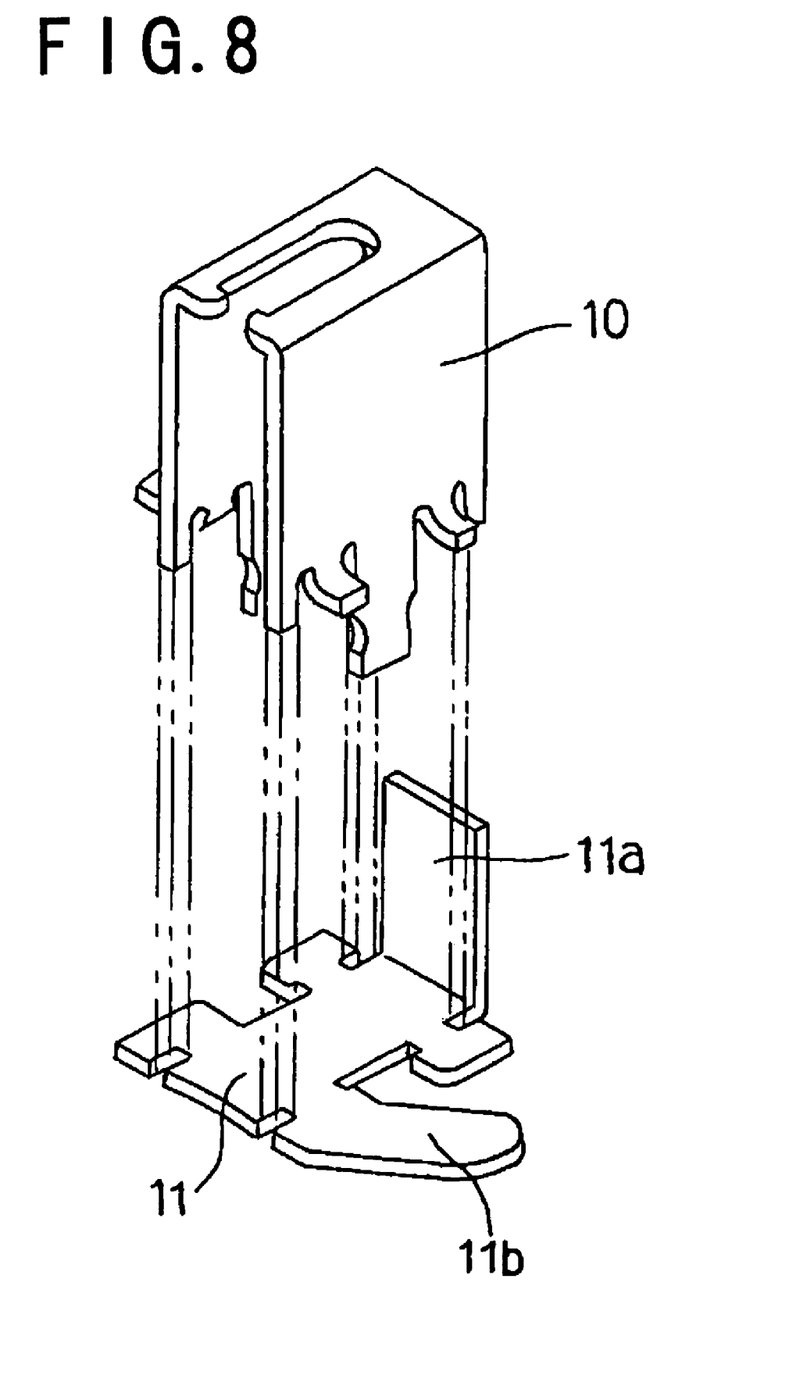
FIG. 8 is a perspective view illustrating a state that a metallic brush holder is assembled with a plate.

FIG. 7 is a plan view illustrating the plate 11. FIG. 8 is a perspective view illustrating a state that the metallic brush holder 10 and the plate 11 are disassembled to show how these are assembled.

As illustrated in FIG. 12, in the conventional brush holder, the pigtail 25 is directly welded to the terminal plate 26. However, in Embodiment 2, a column 11a of the plate 11 is elongated in comparison with the conventional brush holder, the column 11a is welded to the pigtail 12, a protrusion 11b is formed in a part of the plate 11, and the pigtail 12 is connected to the terminal plate 13 by welding the protrusion 11b to the terminal plate 13.

Accordingly, in a manner similar to that in Embodiment 1, the pigtail 12 is welded in an area within 90° of the location at which an introducing portion 9a of the brush 9 is connected to the pigtail 12, whereby it is possible to extend the pigtail 12 in a direction of a motor shaft.

Although an example that four brushes are used is described above, the brush holder according to the present invention is not limited to that having four brushes.

Embodiment 3

Figure 9:
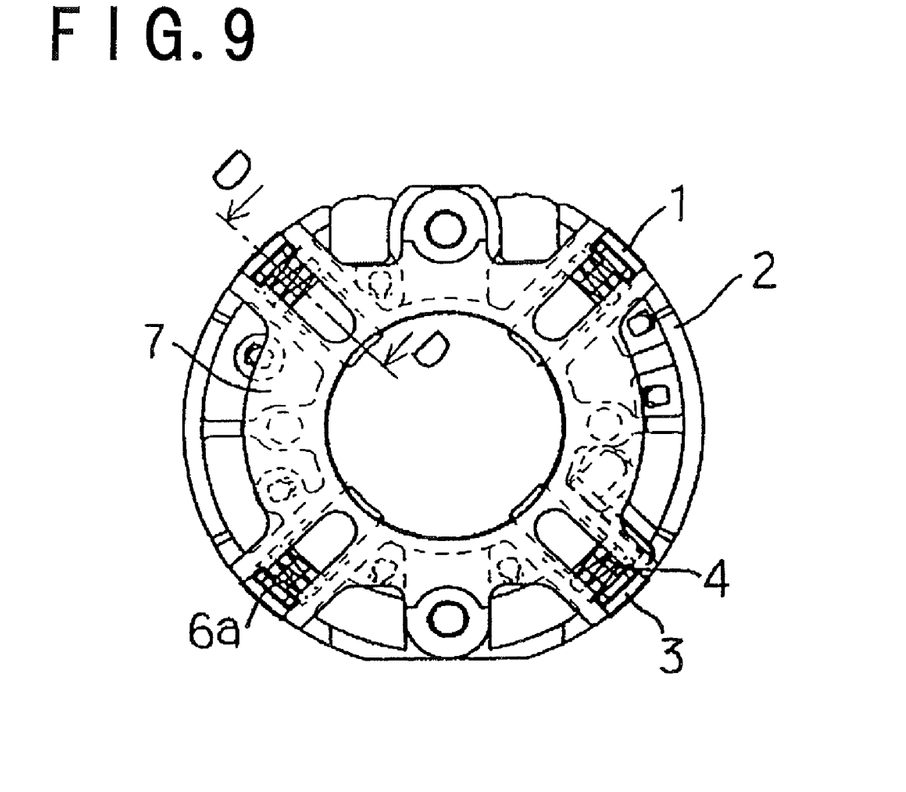
FIG. 9 is a plan view illustrating a brush holder according to Embodiment 3 of the present invention.
Figure 10:
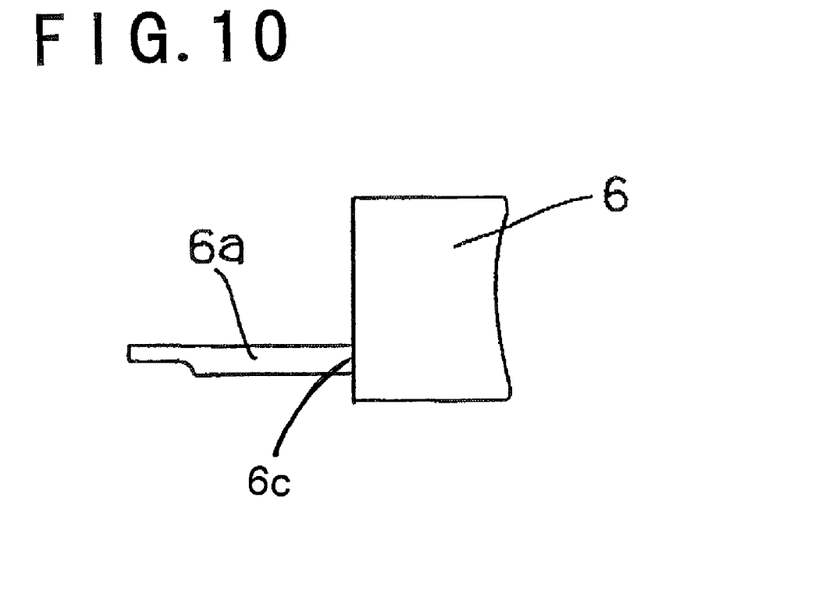
FIG. 10 is a side view illustrating a brush of a brush holder according to Embodiment 3 of the present invention.
Figure 11:
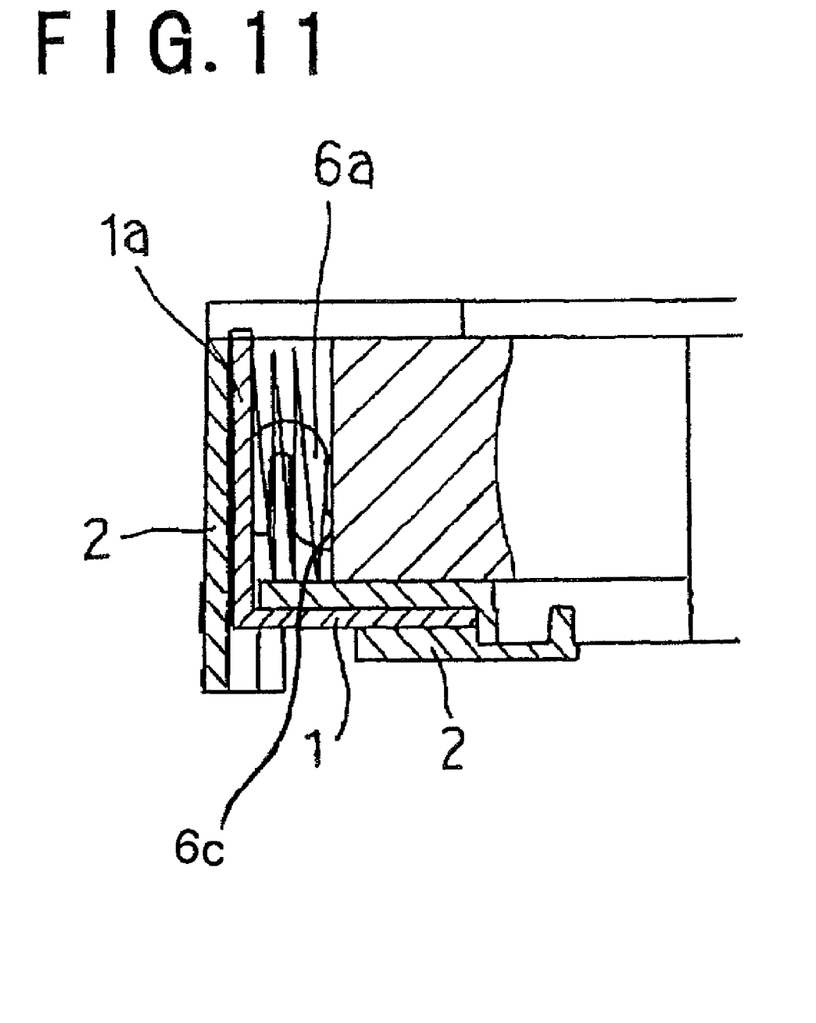
FIG. 11 is a cross-sectional view of the brush holder illustrated in FIG. 9 taken along a line D-D.

FIG. 9 is the plan view illustrating the brush holder according to Embodiment 3 of the present invention. FIG. 10 is a side view illustrating the brush. FIG. 11 is the cross-sectional view of the brush holder illustrated in FIG. 9 taken along the line D-D. According to Embodiment 3, a structure is substantially the same as that in Embodiment 1. However it is different from that of Embodiment 1 at a point that the pigtail 6a is introduced from a backside of the brush 6 as illustrated in FIG. 10.

As illustrated in the figures, the pigtail 6a extends in a direction of a sliding axis from the brush 6, and is welded to the terminals 1 and 3 in an area within 90° from a backside of the brush at which an introducing portion 6c of the brush 6 is connected to pigtail 6a (see FIGS. 10 and 11). In other words the introducing portion 6c is located at a side of the brush which is opposite from the motor shaft, as shown in FIG. 11. Although in the above structure, an example that four brushes are used is shown, the brush holder according to Embodiment 3 is not limited to that having four brushes.

As described, according to Embodiment 3, the pigtail 6a is introduced in the sliding axis of the brush from the brush 6, and the pigtail 6a is connected to the terminals 1 and 3 in the area within 90° on the backside from the introducing portion of the pigtail in the brush 6, whereby it is possible to reduce ripples of torque and an operating noise of a dynamo-electric machine.

In Embodiments 1 through 3, the examples that the pigtail is connected to the terminal by welding, the connection is not limited to welding and may be connections such as caulking or screwing.

Further, the example that the connection is located in the area within 90° on the backside from the introducing portion of the pigtail in the brush is shown, if the connection is located in an area within a smaller angle than 90°, namely a position in the vicinity of a back of the introducing portion of the pigtail in the brush, the ripples of torque and the operating noise can be reduced, and the differences of numbers of revolutions, of the torques, of the ripples of torques, and of the operating noises can be effectively reduced.

Further although the example that the metallic plate is used as the terminal, the terminal is not limited to the metallic plate and may be a lead wire or the like.

The first advantage of the brush holder of the dynamo-electric machine according to the present invention is that the ripples of torque and the operating noise can be reduced.

The second advantage of the brush holder of the dynamo-electric machine according to the present invention is that the pigtail is easily connected to the terminal plate.

The third advantage of the brush holder of the dynamo-electric machine according to the present invention is that the differences of numbers revolutions, of the torques, of the ripples of the torques, and of the operating noises with respect to the both directions can be reduced.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2000-258695 filed on Aug. 29, 2000 including specification, claims, drawings and summary are incorporated herein by reference in its entirety.

What is claimed is:

1. A brush holder for a dynamo-electric machine, comprising:
    a spring and a brush disposed on a brush holder base;
    a pigtail having one end extending from an introducing portion at an upper side of the brush in a direction parallel to a motor shaft; and
    a terminal plate connected to a second end of the pigtail in an area within ±45° from the introducing portion toward the radial direction of the brush holder toward an outside of the brush holder,
    wherein the dynamo-electric machine is rotatable in both directions, and
    wherein the dynamo-electric machine is a motor for an electric power steering, and
    wherein a column extends from the terminal plate and connects with the second end of the pigtail.

2. The brush holder for the dynamo-electric machine according to claim 1, wherein the terminal plate and the second end of the pigtail are connected in an area around a sliding axis of the brush and within the width of the brush along the radial direction.

\* \* \* \* \*